(12) United States Patent
Ido et al.

(10) Patent No.: US 6,511,364 B2
(45) Date of Patent: Jan. 28, 2003

(54) METHOD AND APPARATUS FOR GRINDING ECCENTRIC CYLINDRICAL PORTIONS OF WORKPIECE WITH DIAMETER MEASURING DEVICE

(75) Inventors: Masahiro Ido, Kariya (JP); Kikutoshi Okada, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/115,234

(22) Filed: Apr. 4, 2002

(65) Prior Publication Data

US 2002/0155790 A1 Oct. 24, 2002

(30) Foreign Application Priority Data

Apr. 19, 2001 (JP) ........................................ 2001-121117

(51) Int. Cl.[7] ............................................... B24B 49/00
(52) U.S. Cl. ............................. 451/10; 451/11; 451/49; 451/251
(58) Field of Search ................................ 451/9, 10, 11, 451/49, 54, 246, 249, 251, 399

(56) References Cited

U.S. PATENT DOCUMENTS 4,905,417 A * 3/1990 Oda et al.
5,103,596 A * 4/1992 Fujii et al.
5,773,731 A * 6/1998 Sakakura et al. ............... 451/5
6,306,018 B1 * 10/2001 Coverdale et al. ............ 451/49

FOREIGN PATENT DOCUMENTS

JP 8-5005 1/1996
JP 2000-218531 8/2000

* cited by examiner

Primary Examiner—Eileen P. Morgan
(74) Attorney, Agent, or Firm—Oblon, Spivak, McClelland, Maier & Neustadt, P.C.

(57) ABSTRACT

On a grinding machine, a workpiece having eccentric cylindrical portions is rotated around the work spindle axis so that the eccentric cylindrical portions effects a planetary motion. A grinding wheel is reciprocated toward and away from the work spindle axis in synchronism with the planetary motion and is also fed toward the work spindle axis to grind the eccentric cylindrical portion into a target cylindrical profile. Upon completion of a part of the grinding operation, the eccentric cylindrical portion under machining is indexed to a predetermined angular position. A diameter measuring device is moved from its rest position to a measuring position to measure the diameter of the eccentric cylindrical portion. Comparing the measured diameter with a target diameter to obtain a residual difference in diameter, the grinding machine further operates to perform a finish grinding according to the residual difference until the diameter reaches the target size, whereby the eccentric cylindrical portion can be finished precisely using a general purpose measuring device.

10 Claims, 9 Drawing Sheets

Fig.4 Program for Machining Operation

Fig.5 Program for Crankpin Diameter Measurement and Feed Amount Computation for Finish Grinding

Fig.6

| Crankshaft W # | Amount of Eccentricity | P1 Phase | P2 Phase | P3 Phase | P4 Phase | ...Pm Phase |
|---|---|---|---|---|---|---|
| 1 | S1 | 0 degree | 180 degrees | | | |
| 2 | S2 | 0 degree | 120 degrees | 240 degrees | | |
| 3 | S3 | 0 degree | 180 degrees | 180 degrees | 0 degree | |
| . | . | | | | | |
| . | . | | | | | |
| n | Sn | | | | | |

METHOD AND APPARATUS FOR GRINDING ECCENTRIC CYLINDRICAL PORTIONS OF WORKPIECE WITH DIAMETER MEASURING DEVICE

BACKGROUND OF THE INVENTION

1. Field of the Invention

The present invention relates to a method and an apparatus for grinding eccentric cylindrical portions of a workpiece such as crankpins on a crankshaft, and more particularly to a method and apparatus for grinding an eccentric cylindrical portion while rotating the workpiece around its central axis to effect a planetary motion of the eccentric cylindrical portion.

2. Description of the Prior Art

In a conventional process of grinding eccentric cylindrical portions such as crankpins of a crankshaft used in an internal combustion engine or a compressor, a crankshaft workpiece is rotated around the workpiece spindle axis of a grinding machine to effect a planetary motion of the crankpin portion, and at the same time, a grinding wheel is infed against the crankpin portion while it is reciprocated toward and away from the spindle axis in synchronism with the planetary motion. The feature of grinding operation of this type resides in that there is no need of providing various kinds of dedicated chucks for the respective individual shapes of the crankshafts, as the crankshaft workpiece is rotated around its central (principal) axis. This provides versatile machining process using a general-purpose machine tool. More specifically, in the grinding machine, parameters for controlling the grinding machine in accordance with various different types of crankshafts are registered (or stored) beforehand, so that the machine is flexibly adaptable to the manufacturing of various different types of crankshafts.

An example of such a type of conventional method and apparatus in the art is disclosed in unexamined Japanese patent publication No. 2000-218531. In this technology, a crankpin of a trial workpiece is first ground based on the theoretical grinding parameters (data), and the diameter of the crankpin thus ground is measured by means of a measuring device equipped on the machine. Then, the measured diameter is employed to prepare modified parameters for the rough grinding step, the finish grinding step and so forth by compensating for the errors or differences in diameter involved in the theoretical parameters for the rough grinding step, the finish grinding step and so forth, and thereafter crankpins of workpieces to be produced are ground based on the thus modified parameters. The measuring device used in such a conventional machine is of the type that measures the radius of the crankpin for the diameter thereof. More specifically, a V-block provided at the tip of the measuring device contacts the crankpin with a probe provided projectably at the bottom of the V-cut touching the crankpin surface continually, and then the amount of the probe advance is detected electrically to compute the diameter. Such a measuring device is capable of measuring the diameter during the grinding process, but requires a link mechanism for making the V-block of the measuring head move horizontally and vertically in synchronism with the planetary motion of the crankpin. From the measured crankpin diameter, the measuring device of this type judges the respective timings of switching the grinding operations between two continuous steps among a plurality of grinding steps including a rough grinding step, a fine grinding step, a finish grinding step and so forth and feeds back the judgments to the control unit of the machine in order to properly change the speed of infeeding the grinding wheel against the workpiece.

However, the measuring device as described above uses a V-block for the measuring head which is designed to measure the radius of the workpiece, and therefore, cannot measure the diameter directly with a high accuracy. In addition, the device has such another drawback that it becomes expensive due to the use of a dedicated unit including a link mechanism which permits the reciprocal movement of the measuring head in synchronism with the planetary motion of the crankpin.

SUMMARY OF THE INVENTION

It is therefore a primary object of the present invention to provide a novel method and apparatus capable of grinding an eccentric cylindrical portion of a workpiece with a high accuracy in the dimension of diameter by the use of a general-purpose measuring device which is not only inexpensive to make, but also capable of directly measuring the diameter of the eccentric cylindrical portion on the workpiece with a high accuracy.

According to the present invention, the object is accomplished by providing a method of grinding an eccentric cylindrical portion of a workpiece on a grinding machine with a measuring device, which method comprises the steps of rotating the workpiece around a work spindle axis of the grinding machine, the eccentric cylindrical portion being eccentric away from the work spindle axis to effect a planetary motion when the workpiece is rotated around the work spindle axis; infeeding a grinding wheel toward the work spindle axis while reciprocating the grinding wheel toward and away from the work spindle axis in synchronism with the planetary motion for grinding the eccentric cylindrical portion into a cylindrical profile; indexing the eccentric cylindrical portion to a predetermined angular position upon completion of a part of the grinding operation; moving a diameter measuring device from a rest position to a measuring position to engage the eccentric cylindrical portion held at the predetermined angular position; measuring the diameter of the eccentric cylindrical portion; retracting the diameter measuring device to the rest position; and resuming the feeding of said grinding wheel toward said work spindle axis while reciprocating said grinding wheel toward and away from said work spindle axis in synchronism with said planetary motion, for performing the remaining part of said grinding operation. With this feature of the method according to the present invention, the diameter measurement of the eccentric cylindrical portion is carried out with the eccentric cylindrical portion being held at the predetermined angular position wherein the measuring device is advanced to the standstill object so as to measure the diameter. Therefore, the measurement with a high accuracy can be realized using a simple and thus inexpensive general-purpose measurement device.

According to the present invention, the object is further accomplished by providing a method of the character set forth above wherein the diameter measured upon completion of a part of the grinding operation is compared with a target diameter to obtain the difference in diameter and wherein the eccentric cylindrical portion is further ground by the difference in diameter. With this feature of the method according to the present invention, the further or finish grinding is conducted based on the diameter difference between the measured value and the target value, whereby the workpiece can be finished with a high accuracy.

According to the present invention, the object is also accomplished by providing an apparatus for grinding an eccentric cylindrical portion of a workpiece, comprising: a workpiece rotating device including a workpiece spindle having a work spindle axis for rotating the workpiece around the work spindle axis, the eccentric cylindrical portion being eccentric away from the work spindle axis for effecting a planetary motion when the workpiece is rotated around the work spindle axis; a grinding wheel movable toward the work spindle axis while being reciprocated toward and away from the work spindle axis in synchronism with the planetary motion, for grinding the eccentric cylindrical portion into a cylindrical profile; an indexing device associated with the workpiece rotating device for indexing the eccentric cylindrical portion to a predetermined angular position upon completion of a part of the grinding; and a diameter measuring device movable from a rest position to a measuring position and having a pair of feelers which are engageable with the eccentric cylindrical portion at diametrically opposite surfaces thereof for measuring the diameter of the eccentric cylindrical portion held at the predetermined angular position. With this feature of the apparatus according to the present invention, the rotation of the workpiece is stopped to index the eccentric cylindrical portion to the predetermined angular position for measurement of the diameter thereof, and the measuring device is advanced to the standstill object to measure the diameter with the diametrically opposed feelers. Therefor, the grinding apparatus can be configured with a general-purpose measuring device which is simple in configuration, reliable in operation, reduced in cost and high in measuring accuracy.

According to the present invention, the object is still further accomplished by providing an apparatus of the character set forth above which further comprises a comparing device for comparing the diameter measured upon completion of a part of the grinding operation with a target diameter to obtain the difference in diameter, and a finish grinding control device for causing the grinding wheel to effect a finish grinding on the eccentric cylindrical portion based on the difference in diameter. With this feature of the apparatus according to the present invention, the grinding apparatus can be configured with the comparison device for obtaining the difference in diameter between the state in mid course of grinding and the state on target and can conduct the finish grinding according to the difference so obtained, whereby the workpiece can be finished precisely to the target diameter.

In an aspect of the present invention, an apparatus for grinding an eccentric cylindrical portion of a workpiece further comprise: a parameter registration device for registering parameters concerning amounts of eccentricity of the eccentric cylindrical portion for different types of workpieces; a workpiece identification device for identifying the type of a workpiece to be ground; and a parameter retrieval device for searching the parameter registration device to retrieve an eccentricity amount which corresponds to the type of the workpiece identified by the workpiece identification device; wherein the measuring position of the diameter measuring device is determined depending upon the retrieved eccentricity amount. With this configuration, it becomes possible to change the measuring position of the diameter measuring device automatically in dependence upon the types of workpieces to be ground, so that various types of workpieces having eccentric cylindrical portions of different eccentricties can be ground on the apparatus.

In another aspect of the present invention, an apparatus for grinding eccentric cylindrical portions of a workpiece further comprise: a parameter registration device for registering parameters concerning amounts of eccentricity and phase angles of a plurality of the eccentric cylindrical portions per workpiece with respect to the work spindle axis for different types of workpieces; a workpiece identification device for identifying the type of a workpiece to be ground; and a parameter retrieval device for searching the parameter registration device to retrieve an eccentricity amount and phase angles of the plurality of the eccentric cylindrical portions per workpiece with respect to the work spindle axis which eccentricity amount and phase angles correspond to the type of the workpiece identified by the workpiece identification device; wherein the indexing device indexes the eccentric cylindrical portions to respective angular positions determined by the retrieved phase angles; and wherein the measuring position of the diameter measuring device is determined in dependence upon the retrieved eccentricity amount. With this configuration, automatic processing can be easily performed with respect to a plurality of eccentric cylindrical portions having different phase angles on a workpiece.

In a further aspect of the present invention, the measuring device may include a measuring head and a head traversing device driven by a servomotor to locate the measuring head at desired measuring positions.

In a still further aspect of the present invention, the measuring device may include a measuring head and a head traversing device driven by a cylinder device to locate the measuring head at any of plural measuring positions.

In a still further aspect of the present invention, the indexed angular position for the eccentric cylindrical portion may be determined opposite to the grinding wheel with respect to the workpiece spindle axis in a horizontal plane encompassing the workpiece spindle axis.

In a specific aspect of the present invention, the workpiece may be a crankshaft, and the eccentric cylindrical portion may be a crankpin.

BRIEF DESCRIPTION OF THE DRAWINGS

For better understanding of the present invention, and to show how the same may be practiced and will work, reference will now be made, by way of example, to the accompanying drawings, in which:

FIG. 6 is a chart showing a data table containing parameters for grinding crankshafts;

DESCRIPTION OF THE PREFERRED EMBODIMENTS

Figure 1:
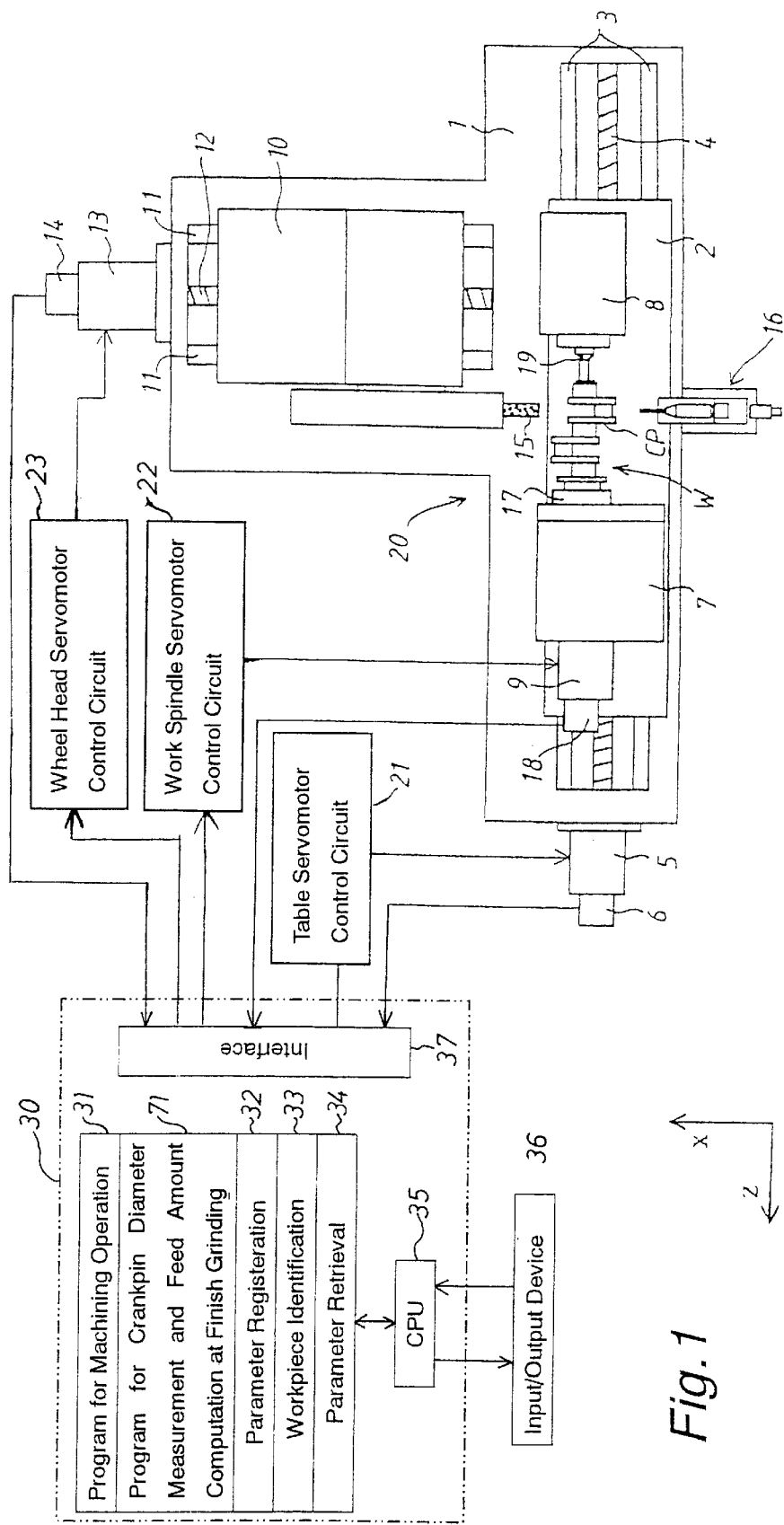
FIG. 1 is a block diagram showing the outline of overall configuration of a grinding machine and the schematic connection of associated control circuits for performing the grinding of crankpins on a crankshaft according to the present invention.

Illustrated in FIG. 1 are the outline of overall configuration of a grinding machine and the schematic connection of associated control circuits for practicing a method of grinding crankpins CP on a crankshaft W according to the present invention. The grinding machine 20 comprises a bed 1, a pair of guide rails 3, 3 extending in the longitudinal direction along the Z axis (as defined in FIG. 1) on the bed 1, and a table 2 slidably supported on the guide rails 3, 3. At the left side area on the table 2, a headstock 7 is arranged carrying a work spindle 17. The work spindle 17 is coupled to an output shaft of a servomotor 9, which in turn is coupled to a rotary encoder 18 for control in rotation. The work spindle 17 has a chuck or the like device (not shown) to grip a journal portion at one end of the crankshaft W. Opposite to the headstock 7, a tailstock 8 is arranged at the right side area on the table 2. The tailstock 8 rotatably supports a journal portion at the other end of the crankshaft W by means of a center 19. With such an arrangement, the rotational axis of the work spindle 17 and the central axis of the journal portions of the crankshaft W coincide with each other, so that the crankshaft W is rotated around the axis of the work spindle 17 to effect a planetary motion of the crankpins CP.

Between the pair of guide rails 3, 3, a ball screw 4 is arranged for moving the table 2 in the direction of Z axis. The ball screw 4 is coupled, at its left end, to an output shaft of a servomotor 5 mounted at the left end of the bed 1. The servomotor 5 is coupled to a rotary encoder 6 to detect the rotational angle of the ball screw 4. This arrangement enables sliding movement of the table 2 as controlled in the Z axis direction, so that each of the crankpins CP on the crankshaft W may be aligned with a grinding wheel 15.

An X axis defines a direction perpendicular to the Z axis on the horizontal plane of the machine. A pair of guide rails 11, 11 are provided on the bed 1 extending along the X axis direction to slidably support a wheel head 10 which carries the grinding wheel 15. Between the pair of guide rails 11, 11, a ball screw 12 is arranged for moving the wheel head 10 in the direction of X axis. The ball screw 12 is coupled, at its rear end, to an output shaft of a servomotor 13 mounted at the rear end (distal end) of the bed 1. The servomotor 13 is coupled to a rotary encoder 14 to detect the rotational angle of the ball screw 12. This arrangement permits a back-and-forth movement of the wheel head 10 as controlled in the X direction which is perpendicular to the central axis of the crankshaft W, so that the grinding wheel can be moved back and forth in synchronism with the planetary motion of the crankpin CP. Further, the grinding wheel 15 mounted on the wheel head 10 is to be rotated as driven by a motor (not shown).

Reference numeral 16 denotes a measuring device featuring the present invention. The measuring device 16 is provided at the front end of the bed 1 of the crankpin grinding machine 20 opposite to the grinding wheel 15. As shown in more detail in FIG. 2, the measuring device 16 is mounted on the bed 1 by means of a connecting member 52. A measuring head 41 is of an approximately rectangle shape having a certain thickness and mounts an upper feeler 44 and a lower feeler 45 on one side for measuring the crankpin CP which is indexed to a position opposed to the grinding wheel 15. The measuring head 41 is supported on a head support 43 via a hinge pin 42, as will be described hereinafter. The head support 43 is mounted on a head slide 46 which is slidably supported on the guide member 49. Fixed at the bottom of the head slide 46 is a driving nut 59, which is engaged with a ball screw 50. The ball screw 50 is connected to an output shaft of a servomotor 47, so that the rotation of the ball screw 50 moves the head slide 46 in the X axis direction. A rotary encoder 48 is mounted on the servomotor 47 to control the moving position of the head slide 46.

Figure 3:
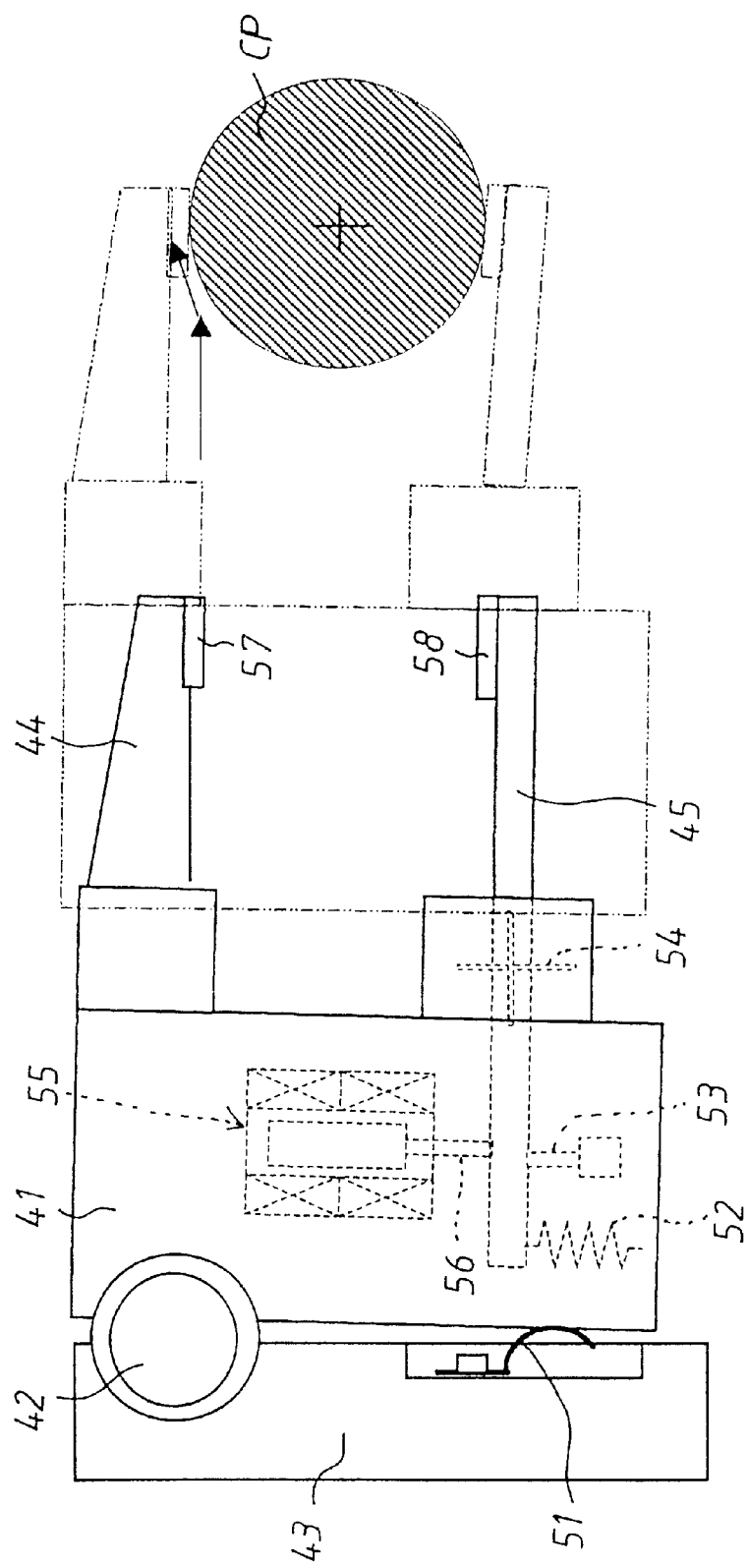
FIG. 3 is a detailed view of FIG. 2 also showing the internal structure of the diameter measuring device according to the present invention.

FIG. 3 shows the measuring head 41 in more detail, in which the upper feeler 44 is fixedly attached to the upper side of the measuring head 41 and has a contact pad 57 attached to the inside tip thereof. The contact pad 57 defines a reference point of measurement in measuring the diameter of the crankpin CP. The lower feeler 45 is movably mounted on the lower side of the measuring head 41, and carries a contact pad 58 attached to the inside tip thereof. The lower feeler 45 is deflectable according to the diameter of the crankpin CP, while the distance between the upper feeler 44 and the lower feeler 45 at its undeflected state is made a little bit narrower than the diameter of the crankpin CP to be measured. Approximately at the middle point along the length of the movable feeler 45 is attached a cross-shape spring 54 to permit the movable feeler 45 to expand outward with the cross-shaped spring 54 serving as a fulcrum of rotation during the diameter measurement. The measuring head 41 contains therein a differential transformer 55 having a movable probe 56 which is secured to the other portion (inside the head box 41) of the movable feeler 45. The differential transformer 55 detects the amount of the movement of the probe 56 electrically, and outputs an electric signal representing such an amount to a numerical control unit 30 which will be described hereinafter. The movable feeler 45 is urged by a tension spring 52 to rotate in the direction of the contact pad 58 moving toward the contact pad 57. When the feeler 45 is in its rest position not performing the measurement as indicated by the solid line in FIG. 3, the other portion of the feeler 45 abuts a stop member 53 which is provided opposite to the probe 56 so that a further rotation of the feeler 45 is limited. The measuring head 41 is rotatably coupled to the head support 43 by means of the hinge pin 42 and is elastically held at a neutral position where the repulsive force of the leaf spring 51 balances with the horizontally pressing force of the measuring head 41 due to its weight. As the measuring head 41 rotates in the direction away from the leaf spring 51 (the leaf spring remains pressing the measuring head with a decreased force) during the measurement, the feeler 44 presses the upper peripheral surface of the crankpin OP with an adequate contact pressure due to the gravity exerted on the measuring head 41 (minus the decreased repulsive force of the leaf spring), while the movable feeler 45 contacts the lower peripheral surface of the crankpin CP due to the tension spring 52.

A numerical control unit 30 (FIG. 1) contains programs for the machining operation 31, for the crankpin diameter measurement and the feed amount computation at the finish grinding step 71, and so forth, and further contains data processing subunits for parameter registration 32, for workpiece identification 33, for parameter retrieval 34, and so forth. The parameter registration subunit 32 is to register an eccentricity amount of the crankpins CP and phase angle of the respective crankpins CP about the central axis of the crankshaft with respect to each of plural types of crankshafts W for the operations of the crankpin grinding machine 20, the workpiece identification subunit 33 is to identify the type (kind) of a crankshaft W to be ground, and the parameter retrieval subunit 34 is to retrieve parameter data representing the eccentricity amount and the phase angle of the crankpins CP with respect to each type of crankshaft W identified by the workpiece identification subunit 33 from the above-explained parameter registration subunit 32.

FIG. 6 shows a data table included in the parameter registration subunit 32. The table contains parameters for grinding crankshafts and more particularly, contains eccentricity amounts S1, S2, . . . , Sn of the crankpins of the respective types #1, #2, . . . , #n of crankshafts W which eccentricity amounts S1, S2, . . . , Sn are to be used for determining the advancing position of the measuring head. The table further contains phase angles P1, P2, . . . , Pm of the existing crankpins on the respective crankshafts, wherein "0 degree" means the direction of nine o'clock, "120 degrees" the direction of five o'clock, "180 degrees" the direction of three o'clock, and "240 degrees" the direction of one o'clock.

The numerical control unit 30 outputs machining instructions to a spindle servomotor control circuit 22, a wheel head servomotor control circuit 23 and a table servomotor control circuit 21 by a CPU 35 via an interface 37 based on the parameters registered in the parameter registration subunit 32. The rotary encoders 6, 14 and 18 respectively attached to the servomotors 5, 13 and 9 respectively detect movements of the table 2, the wheel head 10 and the work spindle 17, and feed back the respective states in controls thereof to the numerical control unit 30 via the interface 37.

The journal portion of the crankshaft W gripped by the chuck of the work spindle 17 has a keyway or the like mark defining the reference angular position of the crankshaft W. The plane encompassing the central axis of the journal portion and the center line of the keyway is defined as an angular reference plane, and the plane angle between this reference plane and another plane encompassing the central axis of the journal portion and the central axis of each crankpin CP is defined as a phase angle of each such crankpin CP with respect to the spindle axis. The chuck of the work spindle 17 is provided with a key not shown which is engageable with the keyway formed on the journal portion, so that the crankshaft W is clamped to the work spindle 17 properly in the rotational direction by holding the journal portion by the chuck with the key being engaged with the keyway. Thus, as the work spindle 17 is rotated and indexed to the phase angle of a particular crankpin CP by means of the servomotor 9, the crankpin CP is indexed and positioned at a proper angle for the diameter measurement by the measuring device 16.

Figure 4:
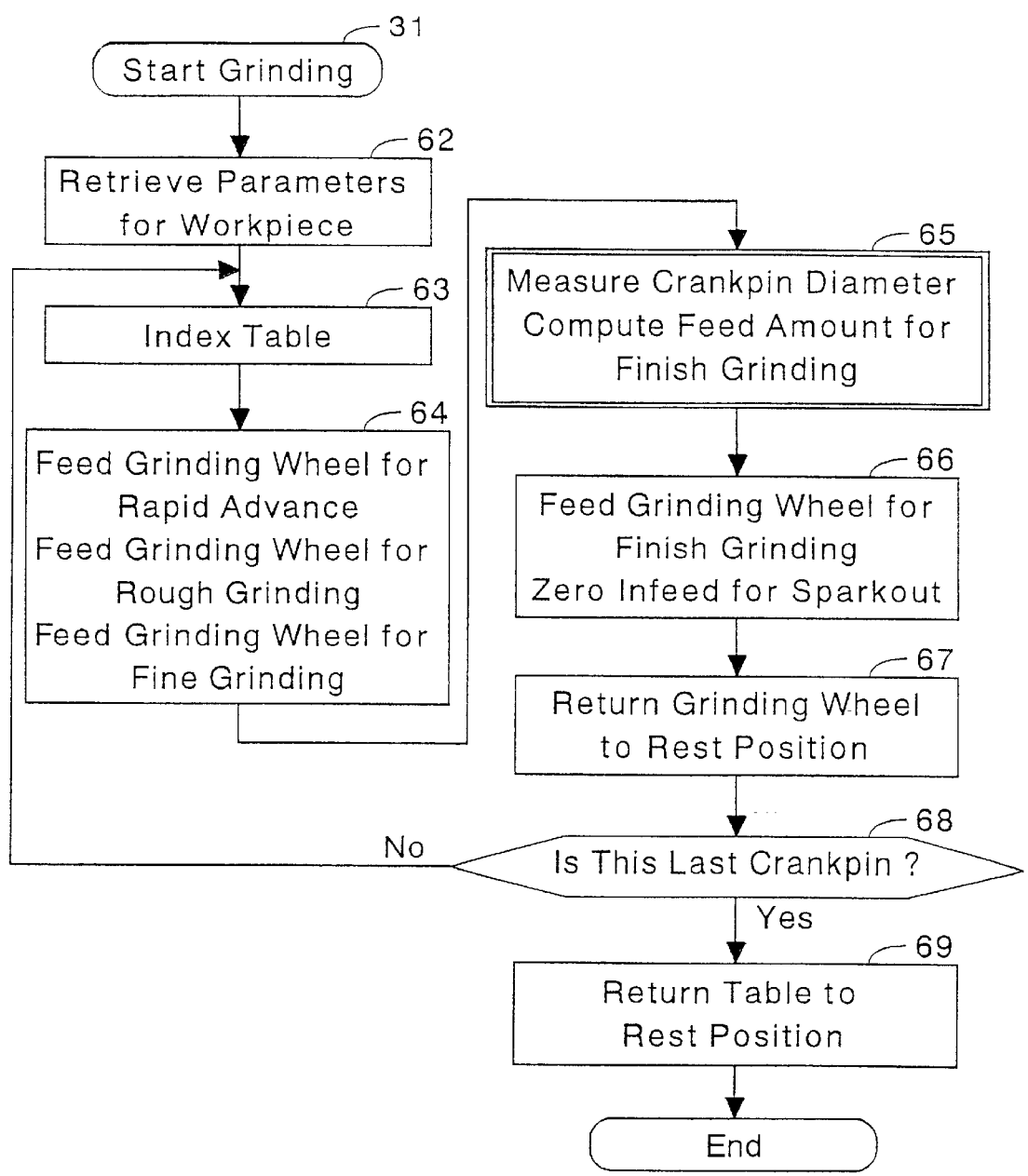
FIG. 4 is a flow chart showing a program for machining operation according to the present invention.

The above described embodiment will work as follows. First, the numerical control unit 30 and the crankpin grinding machine 20 are started to operate. The operator then inserts a crankshaft W to be ground into the chuck of the work spindle 17 with the keyway formed at one end of the journal portion of the crankshaft W being engaged with the key formed on the chuck. The operator then inputs a command to make the journal portion to be clamped by the chuck thereby permitting the phase angles of the crankpins to be identifiable, and the shaft center axis of the other journal portion to be supported by the center 19 of the tailstock 8. The operator next inputs the type # of the crankshaft W to be ground from an input/output device 36 such as a keyboard, and starts the program for the machining operation 31, the flow chart of which is shown in FIG. 4. At a step 62 of FIG. 4, the type of the crankshaft W so input is identified by the workpiece identification subunit 33 in the numerical control unit 30, and accordingly the eccentricity amount and the phase angles of the crankpins CP of the crankshaft W of the type as identified by the workpiece identification subunit 33 are retrieved by the parameter retrieval subunit 34 from among the parameter data registered in the parameter registration subunit 32.

A step 63 is to index the table position as a preparation for the grinding. The CPU 35 in the numerical control unit 30 outputs move instructions to the work spindle servomotor control circuit 22, the wheel head servomotor control circuit 23 and the table servomotor control circuit 21. Thus, the servomotor 5 rotatably drives the ball screw 4 to move the table 2 at a position to index the first crankpin CP to the position opposed to the grinding wheel 15. The servomotor 9 rotatably drives the work spindle 17 to rotate the crankshaft W gripped by the chuck of the work spindle 17 around the spindle axis, which brings about a planetary motion of the crankpin CP. The servomotor 13 rotatably drives the ball screw 12 to move the wheel head 10 back and forth in synchronism with the planetary motion of the crankpin CP, so that the work spindle 17 and the wheel head 10 perform cooperative movements (i.e. a generating movement) for the grinding wheel 15 to grind the crankpin CP in a cylindrical profile.

A step 64 is to feed the grinding wheel 15 toward the crankshaft W. In addition to, or in superposition to, the synchronized reciprocating movement of the wheel head 10 for an eccentric cylindrical profile, the wheel head 10 is advanced in the X axis direction in turn at a rapid advance feed rate, a rough grinding feed rate and a fine grinding feed rate as determined based on the retrieved machining parameters for the identified crankshaft W in order to perform a rough grinding process and then a fine grinding process on the crankpin CP with the grinding wheel 15. When the fine grinding of the crankpin CP is over, the wheel head 10 carrying the grinding wheel 15 is retracted to a predetermined position (standby position), and the work spindle is stopped at the reference angular position (pose) for the diameter measurement of the crankpin as well as for the computation of a feed amount in a finish grinding.

Figure 5:
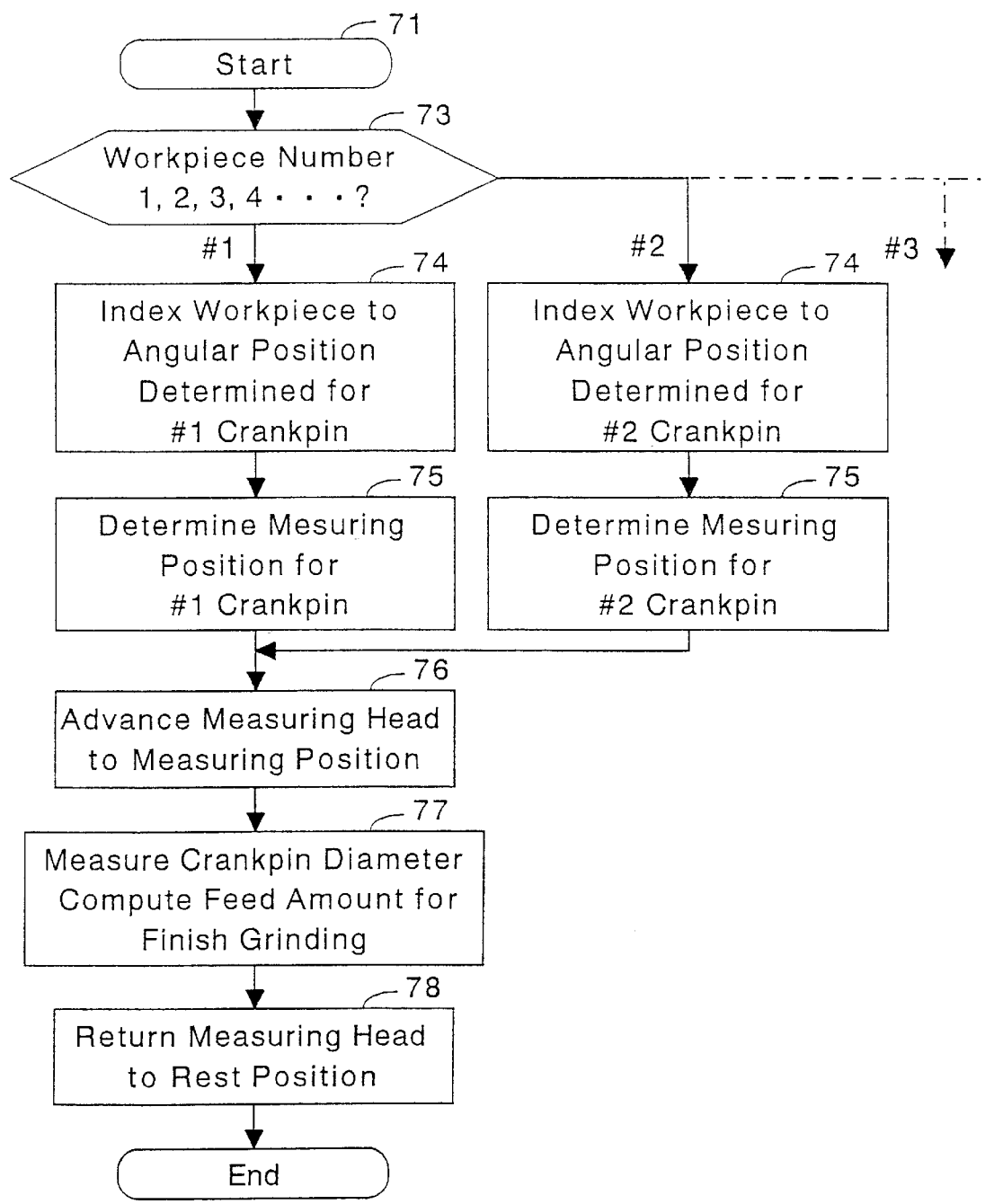
FIG. 5 is a flow chart showing a program for crankpin diameter measurement and feed amount computation at a finish grinding process according to the present invention.
Figure 7:
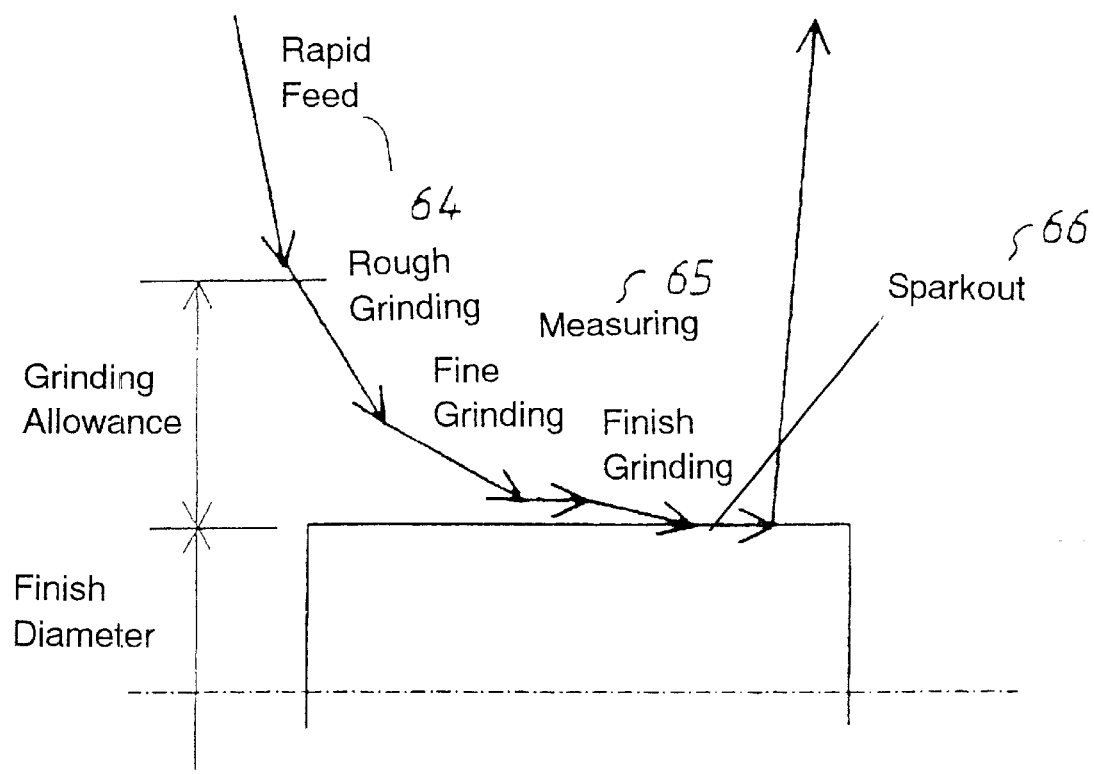
FIG. 7 is an explanatory diagram showing grinding infeed steps of a grinding wheel.

A step 65 is to measure the diameter of the crankpin in mid course of the grinding process. In the step 65, a subroutine processing program 71 for measuring the diameter of the crankpin and for computing the feed amount in finish grinding is executed according to a flow chart shown in FIG. 5. Upon starting of this program 71, the type of the crankshaft W is identified at a step 73 by the workpiece identification subunit 33 based on the type # (e.g. #1) input from the keyboard 36 or the like. The parameter retrieval subunit 34 retrieves from the parameter registration subunit 32 the phase angles of the crankpins CP on the subject crankshaft W (e.g. #1) of the type so identified. At a step 74, the work spindle 17 is indexed and rotated by the servomotor 9 based on the retrieved phase angle and is positioned to a predetermined phase angle for the first crankpin of the subject crankshaft W, i.e. to the angular direction of nine o'clock in this embodiment. Further, the parameter retrieval subunit 34 retrieves an eccentricity amount S1 as registered for the #1 crankshaft W in the parameter registration subunit 32 and determines the measuring position of the crankpin CP of the #1 crankshaft at a step 75.

At a step 76, the servomotor 47 of the measuring device 16 is rotatably driven with a feedback of the detected signal from the rotary encoder 48, and advances the head slide 46 to the measuring position by means of the ball screw 50. In case the crankshaft W is of type #1, the head slide 46 is advanced so that the feelers 44 and 45 are located at the position corresponding to the eccentricity amount S1 of the crankpin CP. Similarly, in case the crankpin shaft W is of type #3, the head slide 46 is advanced so that the feelers 44 and 45 are moved to the position corresponding to the eccentricity amount S3. In such a manner, even in the situation where the types of crankshaft W to be ground are variously and frequently changed, the advancing position of the measuring head 41 is automatically determined and set in accordance with the eccentricity amount registered in the parameter table of the parameter registration subunit for each crankshaft W to be ground. This eliminates a manual adjustment of the advancing position of the measuring head as would be necessary in the case of using a conventional measuring device. As the head slide 46 advances toward the crankpin CP, the contact pad 57 of the feeler 44 and the contact pad 58 of the movable feeler 45 come in contact with the upper and lower peripheral surfaces of the crankpin CP, at which time the measuring head 41 rotates upward about the hinge pin 42 so that the feeler 44 and the movable feeler 45 slides on the upper and lower surfaces of the crankpin CP. According to the control by means of the rotary encoder 48, the measuring head 41 is stopped at the position where the centers of the contact pads 57 and 58 touch the uppermost and lowermost points of the crankpin CP for the diameter measurement.

At this time, the movable feeler 45 in the lower side is pushed outward with the cross-shape spring 54 as the fulcrum of rotation, which in turn moves the probe 56 of the differential transformer 55 into the differential transformer 55. Then at a step 77, the position of the probe 56 relative to the differential transformer 55 is converted into an electric value and is transmitted to the numerical control unit 30 as an electric signal representing the diameter of the crankpin CP. The numerical control unit 30 then computes the feed amount of the wheel head 10 for the fine grinding based on the diameter of the crankpin CP thus measured. The feed amount for the fine grinding is a half of the difference between the measured diameter of the crankpin CP and a target diameter registered beforehand. After the measurement is completed, the measuring head 41 is returned to its rest position at a step 78, whereby the program for measuring the crankpin diameter and computing the feed amount for the finish grinding comes to its end to return to the program 31 for the machining operation resuming at a step 66 of FIG. 4.

Now back to the program 31 for the machining operation, the step 66 is carried out to infeed the wheel head 10 against the crankpin CP by the amount which has been computed for the finish grinding of the crankpin CP. Then, the wheel head 10 is kept at the final finish position for a predetermined short period of time to continue a zero infeed grinding, i.e. a sparkout. Upon completion of the sparkout, the wheel head 10 is retracted to the grinding start position at a step 67. Next, at a step 68, the program checks whether or not, the crankpin CP thus finished is the last crankpin on the crankshaft W under machining. If there still remains another crankpin unfinished on the crankshaft W, the program returns to the step 63 to repeat the aforementioned processing up to the step 67, whereby the table 2 is indexed to a position to bring another crankpin CP to be ground next before the grinding wheel 15 and whereby such another crankpin CP is finished in the same manner as described above. If the judgment at the step 68 is affirmative (Yes), the processing moves forward to a step 69 to return the table 2 to its rest position before ending the machining operation program 31. The operator then inputs a command to disengage the crankshaft W from the chuck of the work spindle 17, and sets another crankshaft W to be ground.

While the above embodiment is described about the case where each of the crankpins CP of the crankshaft W is directed to and kept at the nine o'clock position in mid course of the grinding operation for the diameter measurement by the measuring device 16, the measurements of all the crankpins CP may be performed with the crankshaft W being indexed to a fixed angular position. For example, in the case of a crankshaft for a typical in-line four-cylinder engine, the first and fourth crankpins are indexed to the nine o'clock (or three o'clock) position, while the second and third crankpins lying at a phase angle which is different by 180 degrees from the first and fourth crankpins are indexed to the three o'clock (or nine o'clock) position, so that the measuring head 41 is advanced differently between the first and fourth crankpins and the second and third crankpins. By indexing the crankshaft W to a single angular position for the measurements of all the crankpins CP, the time which would otherwise be necessary for indexing the crankshaft W to respective angular positions for the individual crankpins CP prior to the measurement can be shortened. Moreover, the possibility of erroneous indexing can be minimized, thereby minimizing the possibility of causing damages to the measuring head 41 due to erroneous indexing.

While in the above described embodiment, the crankshaft W is put manually by the operator on the chuck of the work spindle 17 of the crankpin grinding machine 20, it may be set automatically by utilizing a robot arm or the like.

Further, in the above embodiment, the operator inputs the type # of the crankshaft W to be ground from the input/output device 36 such as a keyboard, but alternatively some imprint mark may be affixed to the crankshaft end surface and there may be provided a mark reader for reading such a mark, so that the output signal from the mark reader may be input to the numerical control unit 30 for automatically identifying the type of the crankshaft W.

Figure 2:
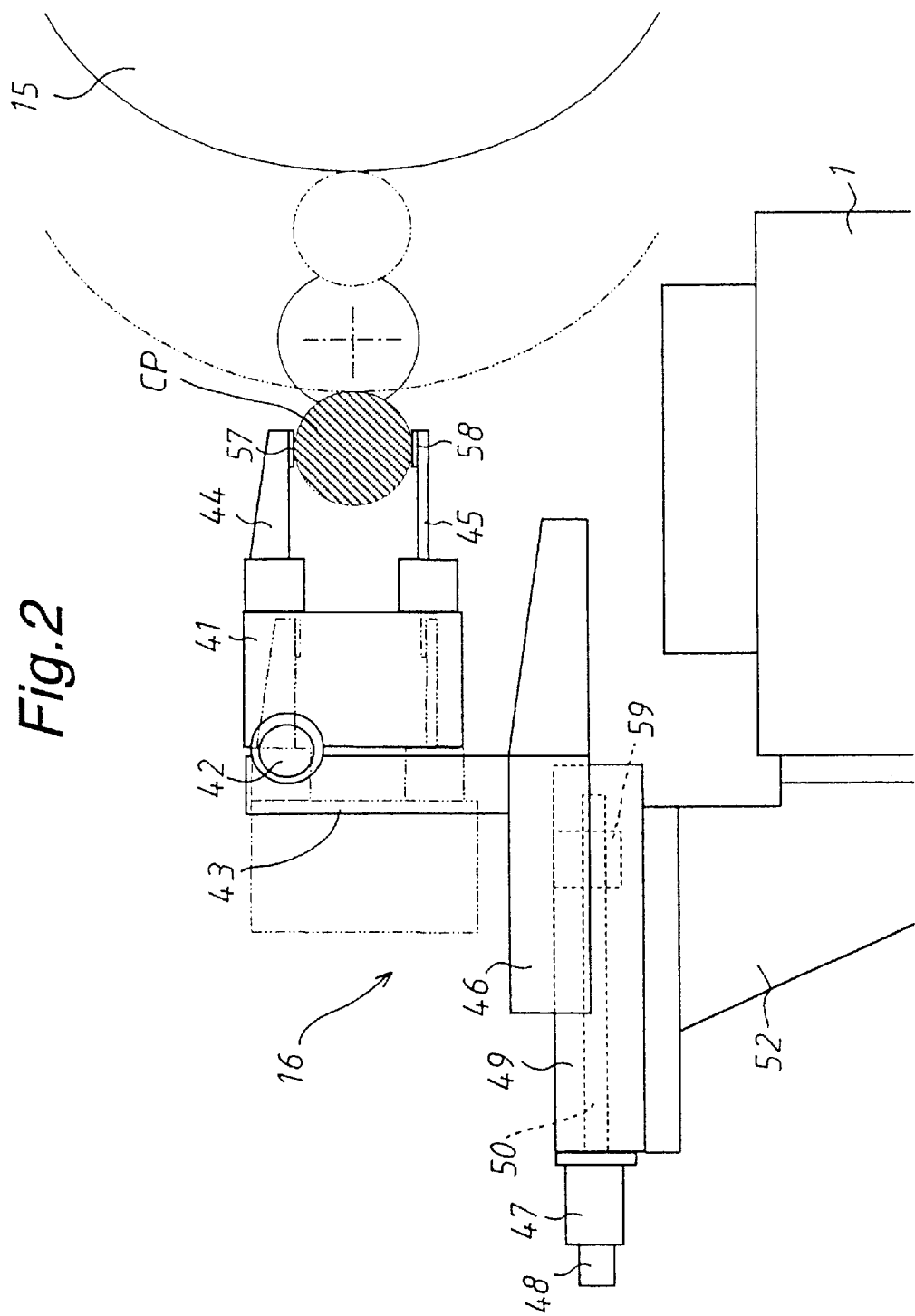
FIG. 2 is a side elevation view of a diameter measuring device according to the present invention.
Figure 8:
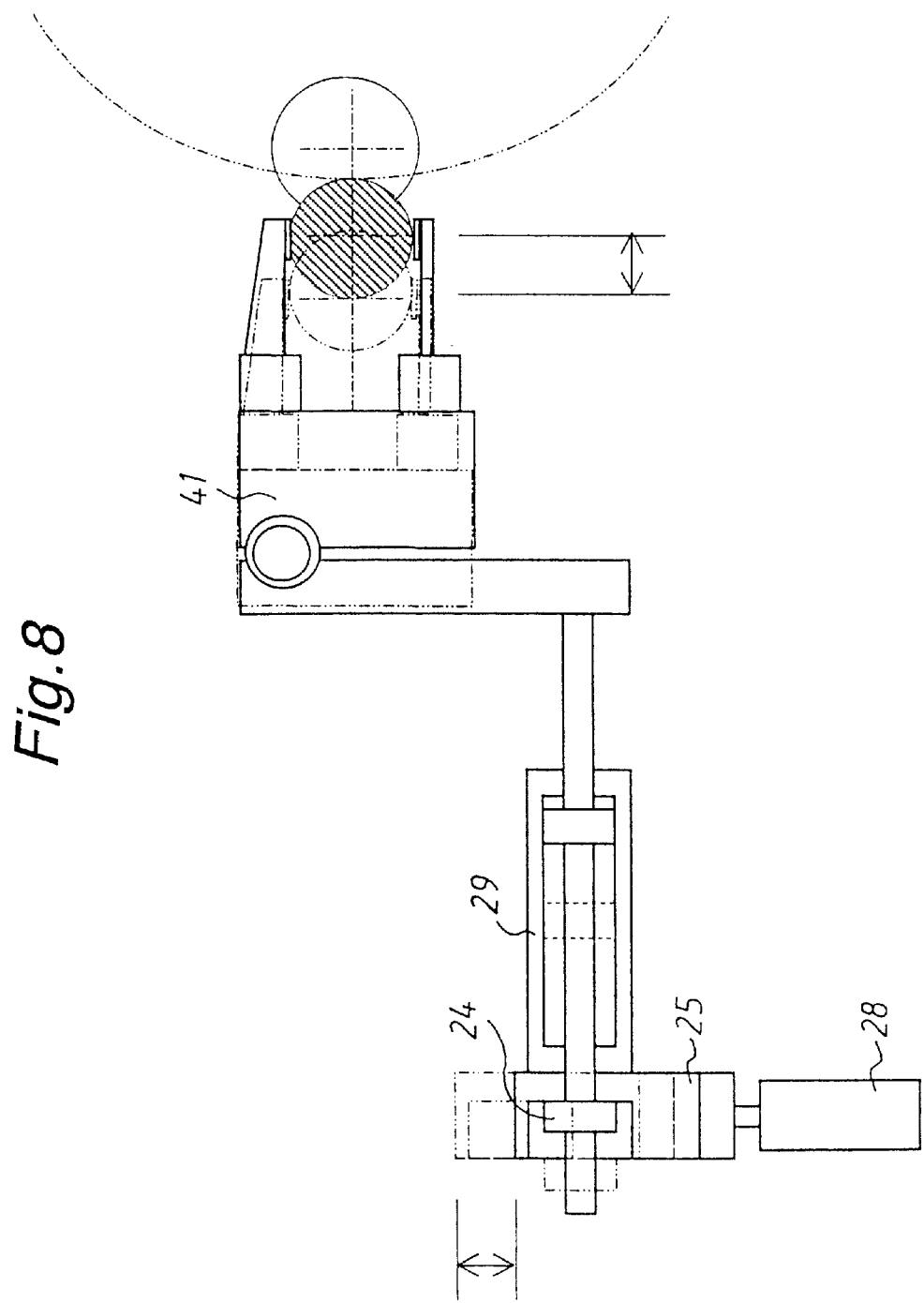
FIG. 8 is a side elevation view of the diameter measuring device in which a measuring head is locatable by means of a drive cylinder at two positions toward and away from the workpiece horizontally.

Further, although in the above embodiment, the back and forth movement of the measuring head 41 is effected by the ball screw 50 driven by the servomotor 47, a cylinder type driving mechanism 29 may be employed as shown in FIG. 8 in place of the servomotor 47 in FIG. 2. In the case of FIG. 8, the measuring position of the measuring head 41 is determined by an abutment piece 24 of the cylinder type driving mechanism 29 abutting on a stop member 25. The stop member 25 may preferably provided with two levels of abutment surfaces on which the abutment piece 24 abuts and the two levels may be selectively designated by shifting the stop member 25 by a cylinder 28. Thus, the measuring head 41 can be positioned at two different positions in the X axis direction. The cylinders 29 and 28 may be of a hydraulic type or a pneumatic type.

Figure 9:
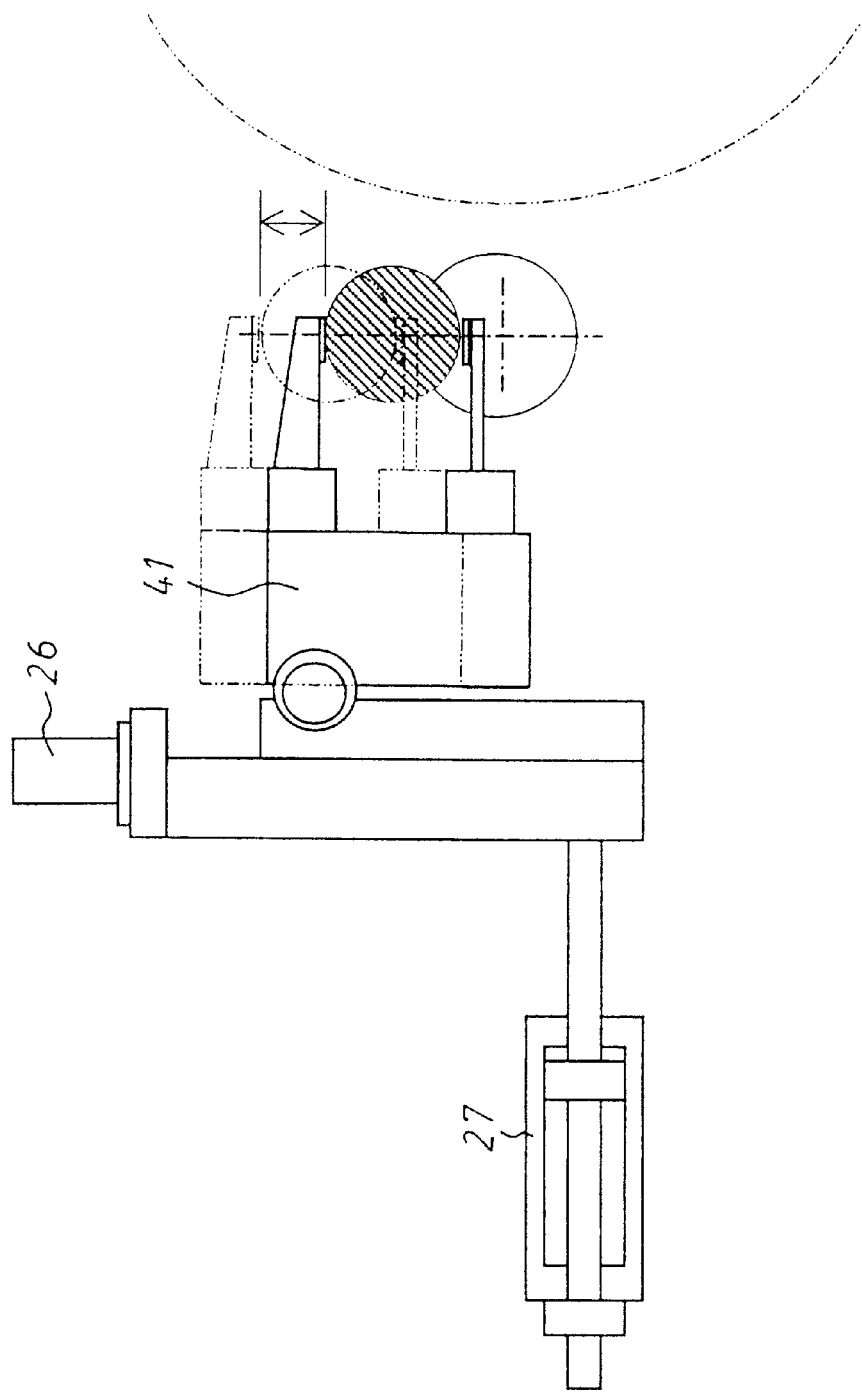
FIG. 9 is a side elevation view of another diameter measuring device in which a measuring head is locatable by means of a ball screw unit driven by a servomotor at desired positions vertically

Although in the above embodiment, the measuring head 41 is movable only in the direction of the X axis but not in the vertical direction, it may be equipped with a servomotor 26 and a ball screw (not shown) to be driven vertically, as shown in FIG. 9, so that the feelers can be placed at an arbitrary height automatically even in the case where the crankpin CP is positioned in the direction of twelve o'clock. In this instance, the height of the measuring head 41 is first adjusted by the servomotor 26, and thereafter the measuring head 41 is advanced in the X axis direction by a cylinder device 27 to measure the diameter of the crankpin CP. As the mechanism of vertically indexing the measuring head 41, a cylinder device which selectively positions the measuring head 41 to two different heights may be employed in place of the servomotor 26. Further, the mechanism for moving the measuring head 41 horizontally in the X axis direction may employ a servomotor in place of the cylinder device 27, so that the measuring head 41 can be moved to any positions in the X axis direction horizontally.

Further, although the nine o'clock position is preferred as an angular position to which the crankpin CP is indexed for measuring the diameter of the same, other angular positions such as the ten o'clock position and the like may be selected instead. In such a case, however, it is preferable to advance the measuring head 41 in a direction parallel to the line which passes across the central axis of the crankpin CP and the central axis of the work spindle (i.e. crankshaft).

While several forms of the invention have been shown and described, other forms will be apparent to those skilled in the art without departing from the spirit of the invention. Therefore, it is to be understood that the embodiments shown in the drawings and described above are merely for illustrative purposes, and are not intended to limit the scope of the invention which is defined by any of the appended claims.

What is claimed is:

1. A method of grinding an eccentric cylindrical portion of a workpiece on a grinding machine with a measuring device, said method comprising the steps of:

rotating said workpiece around a work spindle axis of said grinding machine, said eccentric cylindrical portion being eccentric away from said work spindle axis for effecting a planetary motion when said workpiece is rotated around said work spindle axis;

feeding said grinding wheel toward said work spindle axis while reciprocating said grinding wheel toward and away from said work spindle axis in synchronism with said planetary motion, for grinding said eccentric cylindrical portion into a cylindrical profile;

indexing said eccentric cylindrical portion to a predetermined angular position upon completion of a part of the grinding operation;

moving a diameter measuring device from a rest position to a measuring position to engage said eccentric cylindrical portion held at said predetermined angular position;

measuring the diameter of said eccentric cylindrical portion;

retracting said diameter measuring device to said rest position: and resuming the feeding of said grinding wheel toward said work spindle axis while reciprocating said grinding wheel toward and away from said work spindle axis in synchronism with said planetary motion, for performing the remaining part of said grinding operation.

2. A method of grinding an eccentric cylindrical portion of a workpiece on a grinding machine with a measuring device, said method comprising the steps of:

rotating said workpiece around a work spindle axis of said grinding machine, said eccentric cylindrical portion being eccentric away from said work spindle axis for effecting a planetary motion when said workpiece is rotated around said work spindle axis;

feeding said grinding wheel toward said work spindle axis while reciprocating said grinding wheel toward and away from said work spindle axis in synchronism with said planetary motion, for grinding said eccentric cylindrical portion into a cylindrical profile;

indexing said eccentric cylindrical portion to a predetermined angular position upon completion of a part of the grinding operation;

moving a diameter measuring device from a rest position to a measuring position to engage said eccentric cylindrical portion held at said predetermined angular position;

measuring the diameter of said eccentric cylindrical portion in mid course of the grinding operation;

comparing said measured diameter in mid course of the grinding operation with a target diameter to obtain a residual difference in diameter;

retracting said diameter measuring device to said rest position: and resuming the feeding of said grinding wheel toward said work spindle axis while reciprocating said grinding wheel toward and away from said work spindle axis in synchronism with said planetary motion, for further grinding said eccentric cylindrical portion by said residual difference.

3. An apparatus for grinding an eccentric cylindrical portion of a workpiece, comprising:

a workpiece rotating device including a workpiece spindle having a work spindle axis for rotating said workpiece around said work spindle axis, said eccentric cylindrical portion being eccentric away from said work spindle axis for effecting a planetary motion when said workpiece is rotated around said work spindle axis;

a grinding wheel movable toward said work spindle axis while being reciprocated toward and away from said work spindle axis in synchronism with said planetary motion, for grinding said eccentric cylindrical portion into a cylindrical profile;

an indexing device associated with said workpiece rotating device for indexing said eccentric cylindrical portion to a predetermined angular position upon completion of a part of the grinding; and a diameter measuring device movable from a rest position to a measuring position and having a pair of feelers which are engageable with said eccentric cylindrical portion at diametrically opposite surfaces thereof for measuring the diameter of said eccentric cylindrical portion held at said predetermined angular position.

4. An apparatus for grinding an eccentric cylindrical portion of a workpiece, comprising:

a workpiece rotating device including a workpiece spindle having a work spindle axis for rotating said workpiece around said work spindle axis, said eccentric cylindrical portion being eccentric away from said work spindle axis for effecting a planetary motion when said workpiece is rotated around said work spindle axis;

a grinding wheel movable toward said work spindle axis while being reciprocated toward and away from said work spindle axis in synchronism with said planetary motion, for grinding said eccentric cylindrical portion into a cylindrical profile;

an indexing device associated with said workpiece rotating device for indexing said eccentric cylindrical portion to a predetermined angular position upon completion of a part of the grinding;

a diameter measuring device movable from a rest position to a measuring position for measuring the diameter of said eccentric cylindrical portion held at said predetermined angular position and movable from said measuring position to said rest position upon completion of the measurement;

a comparing device for comparing the measured diameter with a target diameter to obtain a residual difference in diameter of said eccentric cylindrical portion; and a finish grinding control device for causing said workpiece rotating device to rotate said workpiece around said work spindle axis and for causing said grinding wheel to resume the movement toward said work spindle axis while being reciprocated toward and away from said work spindle axis in synchronism with said planetary motion, whereby said eccentric cylindrical portion is further ground by said residual difference.

5. An apparatus for grinding an eccentric cylindrical portion of a workpiece according to claim 3 or 4, further comprising:

a parameter registration device for registering parameters concerning amounts of eccentricity of said eccentric cylindrical portion for different types of workpieces;

a workpiece identification device for identifying the type of a workpiece to be ground; and a parameter retrieval device for searching said parameter registration device to retrieve an eccentricity amount which corresponds to the type of said workpiece identified by said workpiece identification device;

wherein said measuring position of said diameter measuring device is determined in accordance with said retrieved eccentricity amount.

6. An apparatus for grinding eccentric cylindrical portions of a workpiece according to claim 3 or 4, further comprising:

parameter registration device for registering parameters concerning amounts of eccentricity and phase angles of a plurality of said eccentric cylindrical portions per workpiece with respect to said work spindle axis for different types of workpieces;

a workpiece identification device for identifying the type of a workpiece to be ground; and a parameter retrieval device for searching said parameter registration device to retrieve an eccentricity amount and phase angles of said plurality of said eccentric cylindrical portions per workpiece with respect to said work spindle axis which eccentricity amount and phase angles correspond to the type of said workpiece identified by said workpiece identification device;

wherein said indexing device indexes said eccentric cylindrical portions to respective angular positions determined by said retrieved phase angles; and wherein said measuring position of said diameter measuring device is determined in accordance with said retrieved eccentricity amount.

7. An apparatus for grinding eccentric cylindrical portions of a workpiece according to any of claims 3 or 4, wherein:

said measuring device includes a measuring head and a head traversing device driven by a servomotor to locate said measuring head at an arbitrary measuring position.

8. An apparatus for grinding eccentric cylindrical portions of a workpiece according to any of claims 3 or 4, wherein:

said measuring device includes a measuring head and a head traversing device driven by a cylinder device to locate said measuring head at any of plural measuring positions.

9. An apparatus for grinding eccentric cylindrical portions of a workpiece according to any of claims 3 or 4, wherein:

said indexed angular position for said eccentric cylindrical portion is opposite to said grinding wheel with respect to said workpiece spindle axis in a horizontal plane encompassing said workpiece spindle axis.

10. An apparatus for grinding eccentric cylindrical portions of a workpiece according to any of claims 3 or 4, wherein:

said workpiece is a crankshaft, and said eccentric cylindrical portion is a crankpin.

\* \* \* \* \*